Inventor
MARVIN CAMRAS
by The Firm of Charles W. Hills
Attys.

Oct. 6, 1953 M. CAMRAS 2,654,809

MAGNETIC SOUND APPARATUS

Filed Aug. 30, 1947 3 Sheets-Sheet 2

Inventor
MARVIN CAMRAS by The Firm of Charles W. Hills Attys.

Oct. 6, 1953 M. CAMRAS 2,654,809

MAGNETIC SOUND APPARATUS

Filed Aug. 30, 1947 3 Sheets-Sheet 3

Inventor
MARVIN CAMRAS by The Firm of Charles Hills
Attys.

Patented Oct. 6, 1953

2,654,809

UNITED STATES PATENT OFFICE 2,654,809

MAGNETIC SOUND APPARATUS

Marvin Camras, Chicago, Ill., assignor to Armour Research Foundation of Illinois Institute of Technology, Chicago, Ill., a corporation of Illinois Application August 30, 1947, Serial No. 771,494

6 Claims. (Cl. 179—100.2)

This invention relates to a magnetic sound apparatus, and more particularly, to magnetic sound apparatus for use in conjunction with motion pictures.

Three fundamentally different sound recording methods can be used in conjunction with motion pictures. For some time, mechanically cut or embossed recording was the most highly developed, and the first sound pictures employed a phonograph disk synchronized with the picture. An optical sound track, however, is so satisfactory for most sound-on-film work that it is at the present time almost the only form which is being used. Magnetic recording apparently has been neglected, although it has some unusual advantages over the conventional systems.

Although the use of magnetic recording for motion picture film was suggested some time ago, no extensive commercial use of the magnetic recording technique has been employed in the moving picture industry due to the lack of ability of the earlier apparatus to give satisfactory fidelity with low film wear and low film speed.

One of the principal features and objects of the present invention is to provide novel magnetic sound apparatus for motion picture projectors which is convenient to use and economical.

A further object of the present invention is to provide novel apparatus including a magnetic sound head, constant speed drive mechanism, and magnetic sound track which gives greatly improved over-all performance, wide frequency response, high dynamic range, and freedom of distortion.

Another object of the present invention is to provide a novel method and means for synchronization of a magnetic sound film with the picture film while the picture is being taken and while the sound is being magnetically recorded.

Another and further object of the present invention is to provide a novel mounting for an electromagnetic transducer head in magnetic sound recording and reproducing apparatus.

The novel features which I believe to be characteristic of my invention are set forth with particularly in the appended claims. My invention itself, however, both as to its organization, manner of construction and method of operation, together with further objects and advantages thereof, may best be understood by reference to the following description taken in connection with the accompanying drawings, in which:

Figure 1:
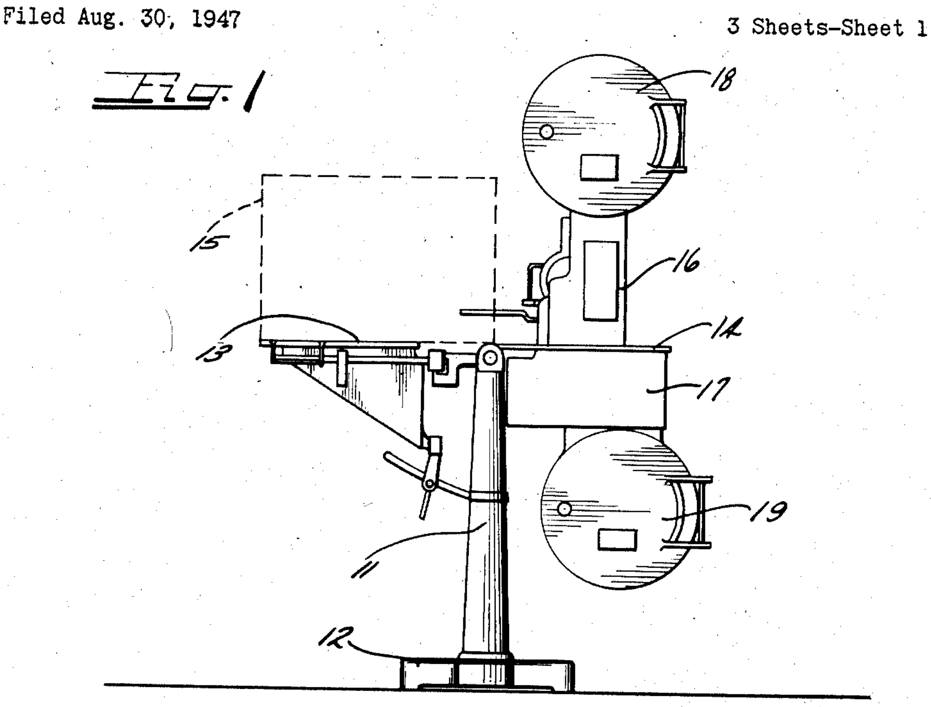
Figure 1 is a side elevation of a commercial type moving picture projector unit with the amplifier, light housing, and lens system removed, and having a magnetic sound reproducer and magnetic recorder substituted thereon in the place of the optical sound system.

As illustrated in Figure 1 of the drawings, the apparatus shown therein is apparatus for transferring standard 35 mm. film from one reel to another, and may be conveniently employed for both magnetic recording and magnetic reproduction. The actual form of the mounting stand illustrated is that commonly found in motion picture projector equipment, but as herein described is to be used for both recording and reproduction.

More particularly, the mounting stand includes a main pedestal 14 having a base 12 with a rear platform 13 at the top of the pedestal 11 and a front platform 14 at the top of the pedestal 11. As is indicated by the broken line 15, the rear platform 13 is usually employed to support a lamp housing and amplifier unit, but in the present embodiment of the invention this may house only an amplifier or both an amplifier, a lamp system and a lens system.

Mounted on the front platform 14 is an upper housing 16 and a lower housing 17, the latter depending below the platform 14. At the top of the upper housing 16 is mounted a reel housing 18 in which a reel of 35 mm. film is arranged to be disposed. At the lower end of the lower housing 17 a second reel housing 19 is supported for rotatably supporting the take-up reel (not shown). Since these upper reel housings 18 and 19 and the manner in which they are supported is conventional and widely known in the motion picture industry by others skilled in the art, a detailed description thereof will not be made.

Figure 2:
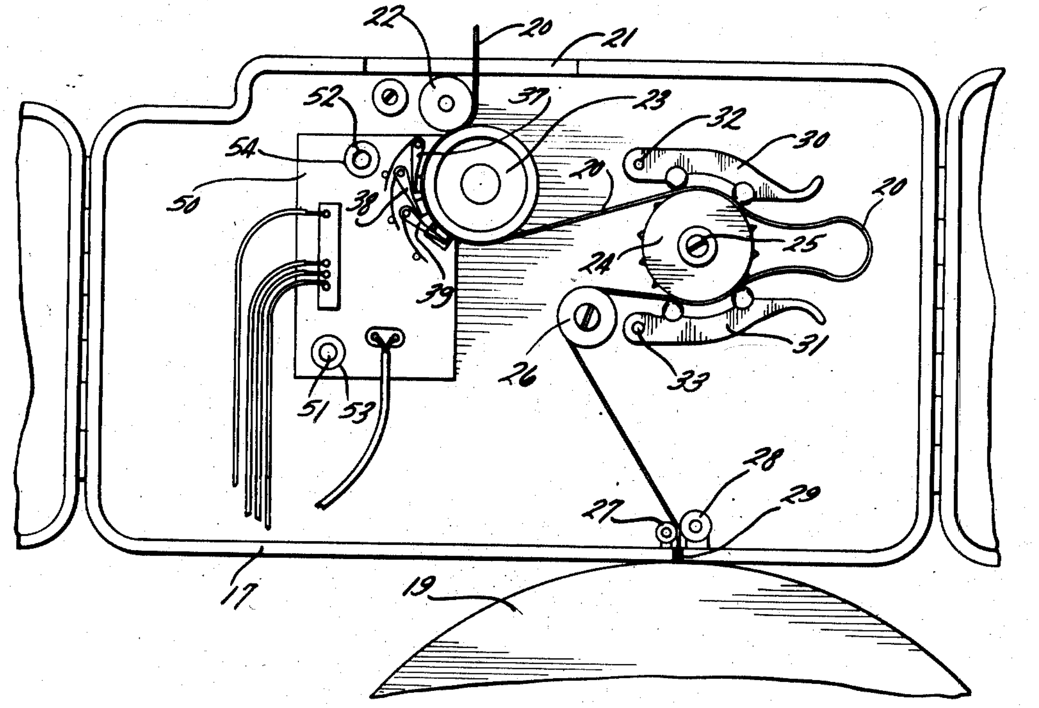
Figure 2 is an enlarged view of the sound recording and pick-up portion of the unit shown in Figure 1 with the door on the housing open to show the mounting of the magnetic heads.

The important portion of the apparatus insofar as the present invention concerned is the apparatus which is contained in the housing 17. As is shown in Figure 2 of the drawings, the film 20 which is being sent down from the upper reel housing 18 enters the lower housing 17 through an opening 21 and then passes over a pinch roller 22 and partially around an oil-damped flywheel 23. This oil-damped flywheel 23 is in effect a rotary stabilizing member driven at constant speed by the pull of the film itself with provision made to damp out variations in its uniform speed of rotation. The film 20 on leaving the rotary stabilizer 23 passes over a sprocket wheel 24 mounted on a drive shaft 25.

The film 20 then makes a loop and passes back over the bottom of the sprocket wheel 24, over a guide pulley 26 and finally down between a pair of guide rollers 27 and 28 and through an opening 29 in the bottom of the housing 17 into the take-up reel housing 19.

A pair of arms 30 and 31 are pivotally mounted as at 32 and 33, respectively, and spring biased in any convenient manner (not shown) toward the sprocket wheel 24 thereby to hold the film 20 in engagement with the sprocket wheel 24.

Figure 3:
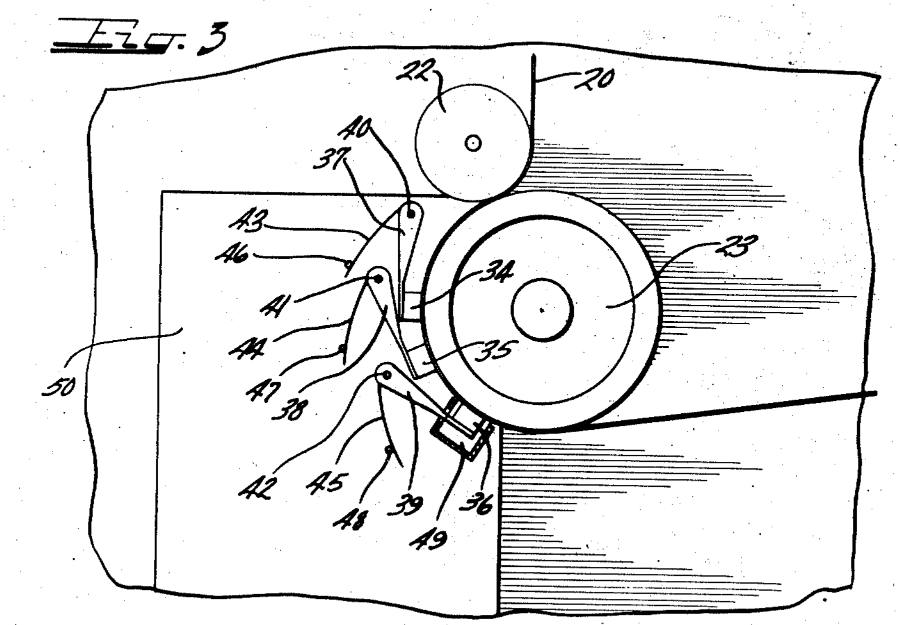
Figure 3 is a greatly enlarged view of the three magnetic heads and oil damped flywheel shown in Figure 2 of the drawings.

As may be seen best in Figure 3 of the drawings, a group of three magnetic heads 34, 35 and 36 are mounted in close relationship to each other around a portion of the rotary stabilizing element 23 over which the film 20 passes. The head 34 is a demagnetizing head for demagnetizing the magnetic sound track on the film 20 as it passes thereunder. The head 35 is an electromagnetic transducer head which may be used as a recording head when the erase head 34 is energized, and when it is desired to make a magnetic recording on the film 20. The head 36 is a monitoring head and is used to reproduce sound immediately after a magnetic record has been made on the film 20 by the electromagnetic transducer head 35, or to reproduce sound when the film is replayed.

These heads 34, 35 and 36 are mounted on arms 37, 38 and 39 which are pivotally mounted on pivot pins 40, 41 and 42, respectively. These pivot pins 40, 41 and 42 are so located with respect to the diameter of the stabilizer 23, the center of rotation of stabilizer 23, and with respect to the length of arms 37, 38 and 39, that a line drawn through heads 34, 35 and 36 and the pivot points of the arms 37, 38 and 39 make an acute angle slightly less than 90°, with radial lines drawn through the heads 34, 35 and 36, respectively, and the center of rotation of stabilizer 23. This arrangement has been found to give greatly improved results.

Springs 43, 44 and 45, which extend around the pivot pins 40, 41 and 42, bear against the arms 37, 38 and 39 at one end and against the stop pins 46, 47 and 48, respectively, at their opposite ends. These springs 43, 44 and 45 normally bias the heads 34, 35 and 36 into engagement with the film 20 as it rides over the rotary stabilizing element 23.

The monitoring or play-back head 36 is preferably provided with a stationary magnetic shield 49 which may conveniently be in the form of a small housing of ferromagnetic material having low coercive force and relatively high permeability.

The mounting pins 40, 41 and 42 and the stop pins 46, 47 and 48 are carried on an adjustable mounting plate 50 which in turn is carried on two mounting posts 51 and 52 carried by the main housing 17. Clamping members 53 and 54 associated with the posts 51 and 52 enable the plate 50 to be moved in and out along the length of the posts 51 and 52 thereby to adjustably position the heads 34, 35 and 36 in different selected lateral positions across the tape 20 as it passes over the rotary stabilizer 23.

Figure 4:
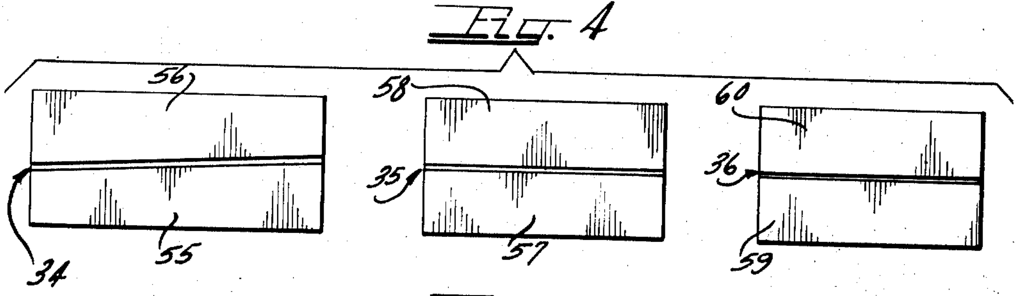
Figure 4 is a still further enlarged view of the ends of the three heads shown in Figure 3.

It has been found that much better results are obtained when graded size heads are used. More particularly, as illustrated in Figure 4 of the drawings, it is preferable that the width of the pole pieces 55 and 56 of the erase head 34 be slightly greater than the width of the pole pieces 57 and 58 of the record head 35. It is also preferable that the width of the pole pieces 57 and 58 of the record head 35 be greater than the width of the pole pieces 59 and 60 of the monitoring or reproducing head 36. With an arrangement such as this, slight errors in lateral alignment are not serious and do not result in distortion or cross-talk which would otherwise be the case when heads of the same size are used.

Figure 5:
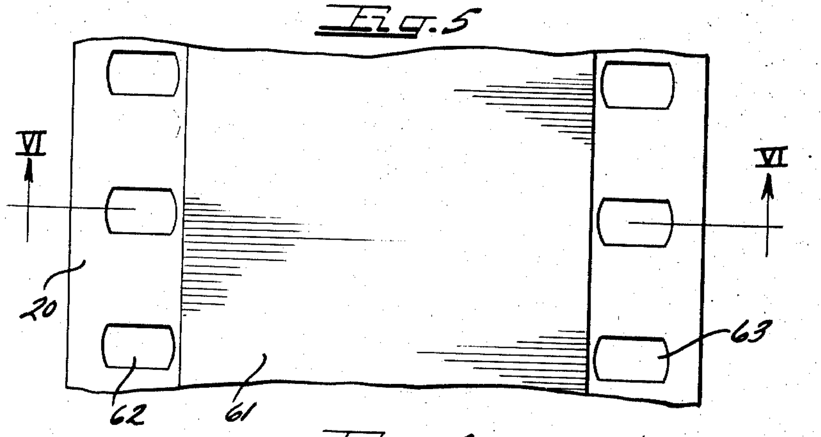
Figure 5 is an enlarged view of a portion of the film with sound track thereon.
Figure 6:
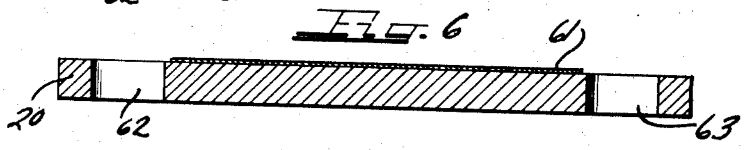
Figure 6 is a cross-sectional view of the film illustrated in Figure 5 as taken along the line VI—VI thereof.

In one arrangement, such as that illustrated in Figures 5 and 6 of the drawings, the film 20 is coated as at 61 over substantially its entire distance between its sprocket holes 62 and 63. On a 35 mm. film, this would give a coating approximately one inch in width. One particularly advantageous width of pole pieces 55 and 56 for the erase head 34 when used with such a film is 0.240 inch. With an erase head of this width, it has been found that a highly satisfactory recording head may be obtained by having its pole pieces 57 and 58 approximately 0.200 inch.

It has also been found that with an erase head and a recording head of the widths just mentioned, an extremely satisfactory monitoring head or pick-up head may be provided by having its pole pieces 59 and 60 approximately 0.187 inch wide.

Using such a group of sound heads and such a film, four sound tracks each approximately $\frac{3}{16}$ inch wide and spaced $\frac{1}{16}$ of an inch apart can be accommodated. The channels are, of course, made available by selectively positioning the mounting plate 50 which carries the heads 34, 35 and 36 at appropriately spaced positions across the lateral dimension of the film. The channels may then be used successively.

Figure 7:
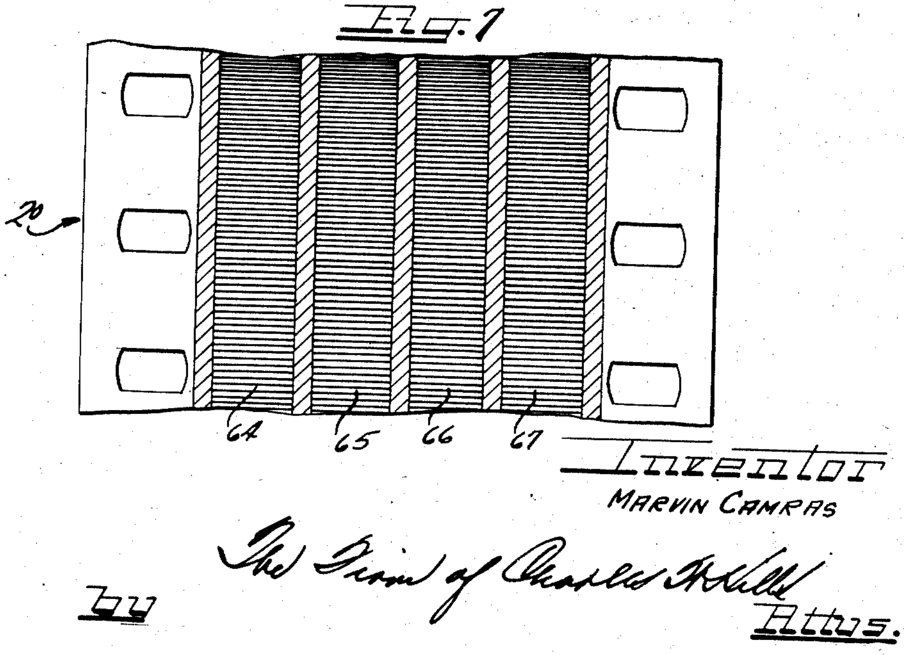
Figure 7 is a view similar to Figure 5 but illustrating a four-channel moving picture film.

Instead of coating the entire film as shown in Figures 5 and 6 of the drawings, four separate and distinct magnetic sound tracks may be coated on the film as at 64, 65, 66 and 67 shown in Figure 7 of the drawings. When separate magnetic sound tracks are coated on the film, it is preferable that each sound track be as least as wide as the width of the erase head in order not to groove the erase head.

Figure 8:
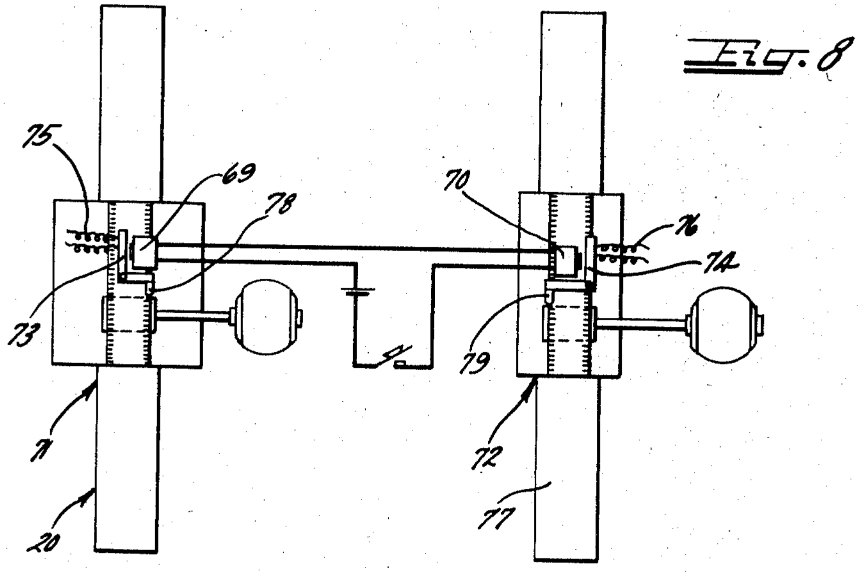
Figure 8 is a diagrammatic view illustrating the synchronization of the magnetic recording with the photographic film, while the photographic film is being exposed.

The apparatus just described lends itself very readily to synchronization with a motion picture camera as is indicated in Figure 8 of the drawings. Here, a pair of relays 69 and 70 are mounted, one on the sound camera 71 and the other on the picture camera 72. Energization of the relays 69 and 70 actuates the rocker arms 73 and 74 against the action of their biasing springs 75 and 76 and put a scratch or dab of paint on the sound film 20 and the picture film 77 by means of the contact tongues 78 and 79 carried on the rocker arms 73 and 74, respectively. These marks are later used for synchronization or for reference. Since the magnetic film may be driven at the same standard speed of 90 feet per minute as the picture film, it will fit directly into editing, re-recording and printing machines (not shown).

While I have shown certain particular embodiments of my invention, it will, of course, be understood that I do not wish to be limited thereto, since many modifications may be made, and I contemplate by the appended claims to cover all such modifications as fall within the true spirit and scope of my invention.

I claim as my invention:

1. Magnetic recording and reproducing apparatus comprises a rotating film supporting constant speed rotating member arranged to carry a film having a magnetizable coating thereon, a main support member upon which said drive member is rotatably mounted, a head supporting member on said main support member, means for adjusting said head supporting member for limited movement parallel to the axis of rotation of said drive member, an erase head, a record head and a play-back head mounted on said head supporting member and disposed against said film as it passes over said drive member, said heads being respectively progressively smaller in width.

2. Magnetic recording and reproducing apparatus comprising a rotating film supporting constant speed rotating member arranged to carry a film having a magnetizable coating thereon, a main support member upon which said drive member is rotatably mounted, a head supporting member on said main support member, means for adjusting said head supporting member for limited movement parallel to the axis of rotation of said drive member, an erase head, a record head and a play-back head mounted on said head supporting member and disposed against said film as it passes over said drive member, each of said heads having a pair of spaced confronting magnetic poles, the magnetic poles of said erase head being slightly larger than the magnetic poles of said record head, and the magnetic poles of said record head being slightly larger than the magnetic poles of said play-back head.

3. Magnetic recording and reproducing apparatus comprising a rotating film supporting constant speed rotating member arranged to carry a film having a plurality of spaced magnetic tracks thereon, a main support member upon which said drive member is rotatably mounted, a head supporting member on said main support member, means for adjusting said head supporting member for limited movement parallel to the axis of rotation of said drive member, an erase head, a record head and a play-back head mounted on said head supporting member and disposed against one of said tracks on said film as said film passes over said drive member, said erase head having a pair of spaced confronting magnetic poles lying successively in the path of movement of said film, each of said sound tracks being at least as wide as the width of said poles of said erase head, and said record and play-back heads each having a pair of spaced confronting magnetic poles lying successively in the path of travel of said film, the width of said poles of said record head and said play-back head being less than the width of said poles of said erase head.

4. Magnetic recording and reproducing apparatus comprising a rotating film supporting rotary stabilizing member over which a film having a magnetizable coating thereon passes, an erase head, a record head and a play-back head mounted in close proximity to said rotary stabilizer and positioned to engage the magnetizable coating on said film as said film passes over said rotary stabilizer, each of said heads having a pair of spaced confronting magnetic poles, the magnetic poles of said erase head being slightly larger than the magnetic poles of said record head, and the magnetic poles of said record head being slightly larger than the magnetic poles of said play-back head.

5. Magnetic recording and reproducing apparatus comprising a rotating film-supporting constant speed rotating member arranged to carry a film having a magnetizable coating thereon, a main support member upon which said rotating member is rotatably mounted, a head supporting member on said main support member, a plurality of magnetic heads, a plurality of arms pivotally mounted on said head supporting member and each carrying one of said heads, said arms positioning said heads for successive contact with a channel on said film as the film travels around said constant speed rotating member, and pressure means urging each of said arms to urge the head carried thereby toward the film, said arms being disposed about said constant speed rotating member in overlapping relation.

6. Magnetic recording and reproducing apparatus comprising a rotating film-supporting constant speed rotating member arranged to carry a film having a magnetizable coating thereon, a main support member upon which said rotating member is rotatably mounted, a head supporting member on said main support member, a plurality of magnetic heads, a plurality of arms pivotally mounted on said head supporting member and each carrying one of said heads, said arms positioning said heads for successive contact with a channel on said film as the film travels around said constant speed rotating member, pressure means urging each of said arms to urge the head carried thereby toward the film, said arms being disposed about said constant speed rotating member in overlapping relation, and means for adjusting said head supporting member in a direction parallel to the axis of rotation of said rotating member to adjust all of said arms simultaneously along the width of said film to register the heads with a selected one of a plurality of tracks on said film.

MARVIN CAMRAS.

References Cited in the file of this patent

UNITED STATES PATENTS

| Number | Name | Date |
|---|---|---|
| 873,084 | Paulsen | Dec. 10, 1907 |
| 1,366,617 | Wier et al. | Jan. 25, 1921 |
| 1,466,750 | Peterson | Sept. 4, 1923 |
| 1,653,467 | O'Neill | Dec. 20, 1927 |
| 1,832,097 | Chipman | Nov. 17, 1932 |
| 1,897,722 | Dahmen | Feb. 14, 1933 |
| 1,949,409 | Cohen | Mar. 6, 1934 |
| 1,950,091 | Owens | Mar. 6, 1934 |
| 2,067,784 | Owens | Jan. 12, 1937 |
| 2,093,769 | Zellger | Sept. 21, 1937 |
| 2,213,246 | Heller | Sept. 3, 1940 |
| 2,413,015 | Iborra | Dec. 24, 1946 |
| 2,418,543 | Camras | Apr. 8, 1947 |
| 2,468,224 | Munsen | Apr. 26, 1949 |
| 2,470,839 | Zuschlog | May 24, 1949 |
| 2,513,423 | Owens | July 4, 1950 |
| 2,530,029 | Pond | Nov. 14, 1950 |
| 2,532,803 | Faus | Dec. 5, 1950 |
| 2,535,480 | Begun | Dec. 26, 1950 |
| 2,538,892 | Begun | Jan. 23, 1951 |
| 2,542,590 | Stove | Feb. 20, 1951 |

FOREIGN PATENTS

| Number | Country | Date |
|---|---|---|
| 69,273 | Norway | May 28, 1935 |